United States Patent
Yu

(10) Patent No.: US 10,200,971 B2
(45) Date of Patent: Feb. 5, 2019

(54) DATA TRANSMISSION METHOD AND COMMUNICATIONS DEVICE

(71) Applicant: Huawei Technologies Co., Ltd., Shenzhen (CN)

(72) Inventor: Zheng Yu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 124 days.

(21) Appl. No.: 15/222,367

(22) Filed: Jul. 28, 2016

(65) Prior Publication Data
US 2016/0338013 A1    Nov. 17, 2016

Related U.S. Application Data

(63) Continuation of application No. PCT/CN2014/071831, filed on Jan. 29, 2014.

(51) Int. Cl.
*H04W 74/00*     (2009.01)
*H04W 72/00*     (2009.01)
(Continued)

(52) U.S. Cl.
CPC ......... *H04W 72/005* (2013.01); *H04L 1/0001* (2013.01); *H04L 1/0075* (2013.01);
(Continued)

(58) Field of Classification Search
CPC .................................................. H04W 76/006
See application file for complete search history.

(56) References Cited

U.S. PATENT DOCUMENTS 9,420,593 B2 *   8/2016   Takeda ..................... H04J 11/00
2009/0175233 A1   7/2009   Ojala et al.
(Continued)

FOREIGN PATENT DOCUMENTS

CN    101645731 A    2/2010
CN    101795492 A    8/2010
(Continued)

OTHER PUBLICATIONS

"PDCCH transmission for MTC coverage enhancement," 3GPP TSG RAN WG1 Meeting #75, R1-135461, 3rd Generation Partnership Project, Valbonne, France (Nov. 11-15, 2013).
(Continued)

*Primary Examiner* — Ayanah S George
(74) *Attorney, Agent, or Firm* — Leydig, Voit & Mayer, Ltd.

(57) ABSTRACT

The present disclosure provides a data transmission method and a communications device. The method includes: determining a first transmission manner of a first physical channel, where the first transmission manner is a manner in which data transmission is performed on the first physical channel; and determining a second transmission manner of a second physical channel according to the first transmission manner, where the second transmission manner is a manner in which data transmission is performed on the second physical channel. It is implemented that a transmission manner of a physical channel different from the first physical channel is determined according to the transmission manner of the first physical channel, and therefore it is implemented that different transmission manners are applied to different channels.

3 Claims, 1 Drawing Sheet

(51) Int. Cl.
*H04L 1/00* (2006.01)
*H04L 1/08* (2006.01)
*H04L 5/14* (2006.01)
*H04W 72/04* (2009.01)
*H04L 5/00* (2006.01)

(52) U.S. Cl.
CPC .............. *H04L 1/08* (2013.01); *H04L 5/0053* (2013.01); *H04L 5/14* (2013.01); *H04W 72/042* (2013.01)

(56) References Cited

U.S. PATENT DOCUMENTS

| | | | |
|---|---|---|---|
| 2012/0093061 | A1 | 4/2012 | Charbit et al. |
| 2012/0307868 | A1 | 12/2012 | Zhou et al. |
| 2013/0301542 | A1* | 11/2013 | Krishnamurthy ..... H04W 52/50 370/329 |
| 2014/0098761 | A1* | 4/2014 | Lee .................... H04W 74/006 370/329 |
| 2015/0049699 | A1* | 2/2015 | Takeda .................... H04J 11/00 370/329 |
| 2016/0192348 | A1 | 6/2016 | Dai et al. |

FOREIGN PATENT DOCUMENTS

| | | |
|---|---|---|
| CN | 101883398 A | 11/2010 |
| CN | 101911573 A | 12/2010 |
| CN | 102014491 A | 4/2011 |
| CN | 103516474 A | 1/2014 |
| EP | 2445132 A1 | 4/2012 |
| JP | 2013533648 A | 8/2013 |

OTHER PUBLICATIONS

"Configurable repetition level for PBCH," 3GPP TSG-RAN WG1 Meeting #73, R1-132055, 3rd Generation Partnership Project, Valbonne, France (May 20-24, 2013).

"Analysis of (E)PDCCH enhancements and timing relationship with PDSCH," 3GPP TSG-RAN WG1#74b, Guangzhou, China, R1-13444, $3^{rd}$ Generation Partnership Project, Valbonne, France (Oct. 7-11, 2013).

"Considerations for (E)PDCCH in coverage enhancement," 3GPP TSG-RAN WG1 Meeting #75, San Francisco, California, R1-135156, $3^{rd}$ Generation Partnership Project, Valbonne, France (Nov. 11-15, 2013).

"New UE category/type for low cost MTC," 3GPP TSG RAN WG1 Meeting #74bis, Guangzhou, China, R1-134128, 3rd Generation Partnership Project, Valbonne, France (Oct. 7-11, 2013).

"Analysis of (E)PDCCH enhancements and timing relationship with PDSCH," 3GPP TSG-RAN WG1#74b, Guangzhou, China, R1-134444, 3rd Generation Partnership Project, Valbonne, France (Oct. 7-11, 2013).

JP 2016-549018, Notice of Reasons for Rejection, dated Apr. 24, 2018.

\* cited by examiner

DATA TRANSMISSION METHOD AND COMMUNICATIONS DEVICE

CROSS-REFERENCE TO RELATED APPLICATIONS

This application is a continuation of International Application No. PCT/CN2014/071831, filed on Jan. 29, 2014, which is hereby incorporated by reference in its entirety.

TECHNICAL FIELD

Embodiments of the present disclosure relate to communications technologies, and in particular, to a data transmission method and a communications device.

BACKGROUND

In Long Term Evolution (LTE for short) based low-cost machine type communication (MTC for short), coverage enhancement is performed on a coverage area of an LTE network, so as to implement normal communication between user equipment in a condition in which channel quality is relatively low and a base station.

In an existing system, according to that downlink coverage is larger than uplink coverage, a method for performing coverage improvement on uplink coverage is used, to implement normal communication between user equipment and a base station. In the prior art, however, coverage improvement is performed by considering only a difference between uplink and downlink coverage areas, and a coverage enhancement value cannot be accurately determined.

SUMMARY

Embodiments of the present disclosure provide a data transmission method and a communications device, so as to improve accuracy for coverage enhancement.

According to a first aspect, an embodiment of the present disclosure provides a data transmission method, including:

determining a first transmission manner of a first physical channel, where the first transmission manner is a manner in which data transmission is performed on the first physical channel; and determining a second transmission manner of a second physical channel according to the first transmission manner, where the second transmission manner is a manner in which data transmission is performed on the second physical channel.

In a first possible implementation manner, the determining a first transmission manner of a first physical channel includes:

acquiring the first physical channel, and determining the first transmission manner according to the first physical channel; or acquiring channel configuration information, and determining the first transmission manner according to the channel configuration information, where the channel configuration information includes configuration information of the first physical channel.

With reference to the first aspect or the first possible implementation manner of the first aspect, in a second possible implementation manner, the first transmission manner is one or more of an enhanced transmission mode, a non-enhanced transmission mode, a default transmission mode, a fallback transmission mode, a resource, a resource index, a level, a level index, an enhancement level, an enhancement level index, a repetition level, a repetition level index, a quantity of levels, a repetition number, an index of a repetition number, a repetition value, a coverage enhancement value, a coverage enhancement range index, a quantity of detections on a pre-specified channel, a level of detection on a pre-specified channel, and an index of a quantity of detections on a pre-specified channel;

information about the second transmission manner is one or more of an enhanced transmission mode, a non-enhanced transmission mode, a default transmission mode, a fallback transmission mode, a resource, a resource index, a level, a level index, an enhancement level, an enhancement level index, a repetition level, a repetition level index, a quantity of levels, a repetition number, an index of a repetition number, a repetition value, a coverage enhancement value, a coverage enhancement range index, a quantity of detections on a pre-specified channel, a level of detection on a pre-specified channel, and an index of a quantity of detections on a pre-specified channel;

the first physical channel is one or more of a physical uplink shared channel, a physical random access channel, an enhanced physical random access channel, a physical downlink control channel, an enhanced physical downlink control channel, a physical control format indicator channel, a physical hybrid automatic repeat request indicator channel, a physical downlink shared channel that bears unicast data, a physical downlink shared channel that bears broadcast or multicast data, a physical downlink shared channel that bears a random access response message, the physical uplink shared channel, a physical uplink control channel, a synchronization channel, and a physical broadcast channel; and the second physical channel is one or more of a physical uplink shared channel, a physical random access channel, an enhanced physical random access channel, a physical downlink control channel, an enhanced physical downlink control channel, a physical control format indicator channel, a physical hybrid automatic repeat request indicator channel, a physical downlink shared channel that bears unicast data, a physical downlink shared channel that bears broadcast or multicast data, a physical downlink shared channel that bears a random access response message, the physical uplink shared channel, a physical uplink control channel, a synchronization channel, and a physical broadcast channel.

With reference to any one of the first aspect to the second possible implementation manner of the first aspect, in a third possible implementation manner, the determining the second transmission manner of a second physical channel according to the first transmission manner includes that:

if the first transmission manner is an $(n1+k1+1)^{th}$ resource, an $(n1+k1+1)^{th}$ resource level, an $(n1+k1+1)^{th}$ level, an $(n1+k1+1)^{th}$ enhancement level, an $(n1+k1+1)^{th}$ repetition level, a configuration of an $(n1+k1+1)^{th}$ repetition, or an $(n1+k1+1)^{th}$ level of detection on a pre-specified channel, where k1 is an integer and n1 is a positive integer, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

With reference to any one of the first aspect to the third possible implementation manner of the first aspect, in a fourth possible implementation manner, the first physical channel is a physical random access channel, an enhanced physical random access channel, or a physical uplink shared channel.

With reference to the fourth possible implementation manner of the first aspect, in a fifth possible implementation manner, the determining a second transmission manner of a second physical channel according to the first transmission manner includes that:

if the first transmission manner is a non-enhanced transmission mode, a default transmission mode, or a fallback transmission mode, the second transmission manner is a non-enhanced transmission mode, a default transmission mode, or a fallback transmission mode, or if the second physical channel is any one of a physical downlink data channel, a physical downlink control channel, an enhanced physical downlink control channel, a physical hybrid automatic repeat request indicator channel, and a physical control format indicator channel, k1 is 0; or if the second physical channel is a physical broadcast channel, a synchronization channel, or a physical downlink data channel that bears system information, k1 is 1; or if the second physical channel is any one of a physical downlink data channel, a physical downlink control channel, an enhanced physical downlink control channel, a physical hybrid automatic repeat request indicator channel, and a physical control format indicator channel, k1 is 0.

With reference to any one of the first aspect to the third possible implementation manner of the first aspect, in a sixth possible implementation manner, the determining a second transmission manner of a second physical channel according to the first transmission manner includes:

determining the second transmission manner of the second physical channel according to the first transmission manner and third information, where the third information is one or more of a frame structure type, a class of user equipment UE, a category of the UE, a type of the UE, a modulation and coding scheme, a power setting, a spreading factor, a power boost multiplier, a quantity of attempt times, information about a transmission time interval bundling size, a frequency hopping status, a performance requirement, an antenna configuration, a transport block size, and a quantity of transport layers.

With reference to the sixth possible implementation manner of the first aspect, in a seventh possible implementation manner, the determining the second transmission manner of the second physical channel according to the first transmission manner and third information includes that:

if the first transmission manner is a non-enhanced transmission mode, a default transmission mode, or a fallback transmission mode, and the class or category of the UE is 0, the second transmission manner is an enhanced transmission mode; or if the first transmission manner is a non-enhanced transmission mode, a default transmission mode, or a fallback transmission mode, and the class or category of the UE is 0, the second transmission manner is a non-enhanced transmission mode, a default transmission mode, or a fallback transmission mode.

With reference to the seventh possible implementation manner of the first aspect, in an eighth possible implementation manner, the determining the second transmission manner of a second physical channel according to the first transmission manner further includes that:

if the second physical channel is a physical uplink control channel, and/or the frame structure type is frequency division duplex or half-frequency division duplex, k1 is 0; or if the second physical channel is a physical uplink control channel, and the frame structure type is a time division duplex system, k1 is −1.

With reference to the seventh possible implementation manner of the first aspect, in a ninth possible implementation manner, the determining a second transmission manner of a second physical channel according to the first transmission manner includes that:

if the second physical channel is any one of a physical downlink data channel, a physical downlink control channel, an enhanced physical downlink control channel, a physical hybrid automatic repeat request indicator channel, and a physical control format indicator channel, the frame structure type is frequency division duplex or half-frequency division duplex, and/or the category of the UE is a nonzero value, k1 is 0; or if the second physical channel is any one of a physical downlink data channel, a physical downlink control channel, an enhanced physical downlink control channel, a physical hybrid automatic repeat request indicator channel, and a physical control format indicator channel, and the frame structure type is time division duplex, k1 is −1; or if the second physical channel is any one of a physical downlink data channel, a physical downlink control channel, an enhanced physical downlink control channel, a physical hybrid automatic repeat request indicator channel, and a physical control format indicator channel, and the category of the UE is 0, k1 is −1; or if the second physical channel is any one of a physical downlink data channel, a physical downlink control channel, an enhanced physical downlink control channel, a physical hybrid automatic repeat request indicator channel, and a physical control format indicator channel, the category of the UE is 0, and the frame structure type is frequency division duplex or half-frequency division duplex, k1 is −1; or if the second physical channel is any one of a physical downlink data channel, a physical downlink control channel, an enhanced physical downlink control channel, a physical hybrid automatic repeat request indicator channel, and a physical control format indicator channel, the category of the UE is a nonzero value, and the frame structure type is time division duplex, k1 is −1; or if the second physical channel is any one of a physical downlink data channel, a physical downlink control channel, an enhanced physical downlink control channel, a physical hybrid automatic repeat request indicator channel, and a physical control format indicator channel, the category of the UE is 0, and the frame structure type is time division duplex, k1 is −2.

With reference to the seventh possible implementation manner of the first aspect, in a tenth possible implementation manner, the determining a second transmission manner of a second physical channel according to the first transmission manner includes that:

if the second physical channel is a physical broadcast channel, a synchronization channel, or a physical downlink data channel that bears system information, and the frame structure type is frequency division duplex or half-frequency division duplex, k1 is 1; or if the second physical channel is a physical broadcast channel, a synchronization channel, or a physical downlink data channel that bears system information, and the category of the UE is a nonzero value, k1 is 1; or if the second physical channel is a physical broadcast channel, a synchronization channel, or a physical downlink data channel that bears system information, the category of the UE is a nonzero value, and the frame structure type is frequency division duplex or half-frequency division duplex, k1 is 1; or if the second physical channel is a physical broadcast channel, a synchronization channel, or a physical downlink data channel that bears system information, and the frame structure type is a system and is time division duplex, k1 is 0; or if the second physical channel is a physical broadcast channel, a synchronization channel, or a physical downlink data channel that bears system information, and the category of the UE is 0, k1 is 0; or if the second physical channel is a physical broadcast channel, a synchronization channel, or a physical downlink data channel that bears system information, the category of the UE is 0, and the frame structure type is frequency division duplex or half-frequency division duplex, k1 is 0; or if the second physical channel is a physical broadcast channel, a synchronization channel, or a physical downlink data channel that bears system information, the category of the UE is a nonzero value, and the frame structure type is time division duplex, k1 is 0; or if the second physical channel is a physical broadcast channel, a synchronization channel, or a physical downlink data channel that bears system information, the category of the UE is a nonzero value, and the frame structure type is frequency division duplex or half-frequency division duplex, k1 is 0; or if the second physical channel is a physical broadcast channel, a synchronization channel, or a physical downlink data channel that bears system information, the category of the UE is 0, and a network system is time division duplex, k1 is −1; or if the second physical channel is a physical broadcast channel, a synchronization channel, or a physical downlink data channel that bears system information, the category of the UE is 0, and the frame structure type is frequency division duplex or half-frequency division duplex, k1 is −1; or if the second physical channel is a physical broadcast channel, a synchronization channel, or a physical downlink data channel that bears system information, the category of the UE is a nonzero value, and the frame structure type is time division duplex, k1 is −1; or if the second physical channel is a physical broadcast channel, a synchronization channel, or a physical downlink data channel that bears system information, the category of the UE is 0, and the frame structure type is time division duplex, k1 is −2.

With reference to any one of the first aspect to the second possible implementation manner of the first aspect, in an eleventh possible implementation manner, the first transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel, where n is a positive integer; and the determining a second transmission manner of a second physical channel according to the first transmission manner includes that:

if the first physical channel is the first physical channel is a physical random access channel or an enhanced physical random access channel, and the second physical channel is a physical uplink shared channel, the second transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel; or if the first physical channel is a physical uplink shared channel, and the second physical channel is a physical random access channel or an enhanced physical random access channel, the second transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel.

According to a second aspect, an embodiment of the present disclosure provides a communications device, including a transmitter, a receiver, a memory, and a processor that is separately connected to the transmitter, the receiver, and the memory, where the processor is configured to determine a first transmission manner of a first physical channel, where the first transmission manner is a manner in which data transmission is performed on the first physical channel; and determine a second transmission manner of a second physical channel according to the first transmission manner, where the second transmission manner is a manner in which data transmission is performed on the second physical channel.

In a first possible implementation manner, the receiver is configured to acquire the first physical channel, and determine the first transmission manner according to the first physical channel; or acquire channel configuration information, and determine the first transmission manner according to the channel configuration information, where the channel configuration information includes configuration information of the first physical channel.

With reference to the second aspect or the first possible implementation manner of the second aspect, in a second possible implementation manner, the first transmission manner is one or more of an enhanced transmission mode, a non-enhanced transmission mode, a default transmission mode, a fallback transmission mode, a resource, a resource index, a level, a level index, an enhancement level, an enhancement level index, a repetition level, a repetition level index, a quantity of levels, a repetition number, an index of a repetition number, a repetition value, a coverage enhancement value, a coverage enhancement range index, a quantity of detections on a pre-specified channel, a level of detection on a pre-specified channel, and an index of a quantity of detections on a pre-specified channel;

information about the second transmission manner is one or more of an enhanced transmission mode, a non-enhanced transmission mode, a default transmission mode, a fallback transmission mode, a resource, a resource index, a level, a level index, an enhancement level, an enhancement level index, a repetition level, a repetition level index, a quantity of levels, a repetition number, an index of a repetition number, a repetition value, a coverage enhancement value, a coverage enhancement range index, a quantity of detections on a pre-specified channel, a level of detection on a pre-specified channel, and an index of a quantity of detections on a pre-specified channel;

the first physical channel is one or more of a physical uplink shared channel, a physical random access channel, an enhanced physical random access channel, a physical downlink control channel, an enhanced physical downlink control channel, a physical control format indicator channel, a physical hybrid automatic repeat request indicator channel, a physical downlink shared channel that bears unicast data, a physical downlink shared channel that bears broadcast or multicast data, a physical downlink shared channel that bears a random access response message, the physical uplink shared channel, a physical uplink control channel, a synchronization channel, and a physical broadcast channel; and the second physical channel is one or more of a physical uplink shared channel, a physical random access channel, an enhanced physical random access channel, a physical downlink control channel, an enhanced physical downlink control channel, a physical control format indicator channel, a physical hybrid automatic repeat request indicator channel, a physical downlink shared channel that bears unicast data, a physical downlink shared channel that bears broadcast or multicast data, a physical downlink shared channel that bears a random access response message, the physical uplink shared channel, a physical uplink control channel, a synchronization channel, and a physical broadcast channel.

With reference to any one of the second aspect to the second possible implementation manner of the second aspect, in a third possible implementation manner, if the first transmission manner is an $(n1+k1+1)^{th}$ resource, an $(n1+k1+1)^{th}$ resource level, an $(n1+k1+1)^{th}$ level, an $(n1+k1+1)^{th}$ enhancement level, an $(n1+k1+1)^{th}$ repetition level, a configuration of an $(n1+k1+1)^{th}$ repetition, or an $(n1+k1+1)^{th}$ level of detection on a pre-specified channel, where k1 is an integer and n1 is a positive integer, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

With reference to any one of the second aspect to the third possible implementation manner of the second aspect, in a fourth possible implementation manner, the first physical channel is a physical random access channel, an enhanced physical random access channel, or a physical uplink shared channel.

With reference to the fourth possible implementation manner of the second aspect, in a fifth possible implementation manner, the determining a second transmission manner of a second physical channel according to the first transmission manner includes that:

if the first transmission manner is a non-enhanced transmission mode, a default transmission mode, or a fallback transmission mode, the second transmission manner is a non-enhanced transmission mode, a default transmission mode, or a fallback transmission mode, or if the second physical channel is any one of a physical downlink data channel, a physical downlink control channel, an enhanced physical downlink control channel, a physical hybrid automatic repeat request indicator channel, and a physical control format indicator channel, k1 is 0; or if the second physical channel is a physical broadcast channel, a synchronization channel, or a physical downlink data channel that bears system information, k1 is 1; or if the second physical channel is any one of a physical downlink data channel, a physical downlink control channel, an enhanced physical downlink control channel, a physical hybrid automatic repeat request indicator channel, and a physical control format indicator channel, k1 is 0.

With reference to any one of the second aspect to the third possible implementation manner of the second aspect, in a sixth possible implementation manner, the processor is specifically configured to determine the second transmission manner of the second physical channel according to the first transmission manner and third information, where the third information is one or more of a frame structure type, a class of user equipment UE, a category of the UE, a type of the UE, a modulation and coding scheme, a power setting, a spreading factor, a power boost multiplier, a quantity of attempt times, information about a transmission time interval bundling size, a frequency hopping status, a performance requirement, an antenna configuration, a transport block size, and a quantity of transport layers.

With reference to the sixth possible implementation manner of the second aspect, in a seventh possible implementation manner, the processor is specifically configured to: if the first transmission manner is a non-enhanced transmission mode, a default transmission mode, or a fallback transmission mode, and the class or category of the UE is 0, determine that the second transmission manner is an enhanced transmission mode; or if the first transmission manner is a non-enhanced transmission mode, a default transmission mode, or a fallback transmission mode, and the class or category of the UE is 0, determine that the second transmission manner is a non-enhanced transmission mode, a default transmission mode, or a fallback transmission mode.

With reference to the seventh possible implementation manner of the second aspect, in an eighth possible implementation manner, the processor is further configured to: if the second physical channel is a physical uplink control channel, and/or the frame structure type is frequency division duplex or half-frequency division duplex, determine that k1 is 0; or if the second physical channel is a physical uplink control channel, and the frame structure type is a time division duplex system, determine that k1 is −1.

With reference to the seventh possible implementation manner of the second aspect, in a ninth possible implementation manner, the processor is specifically configured to: if the second physical channel is any one of a physical downlink data channel, a physical downlink control channel, an enhanced physical downlink control channel, a physical hybrid automatic repeat request indicator channel, and a physical control format indicator channel, the frame structure type is frequency division duplex or half-frequency division duplex, and/or the category of the UE is a nonzero value, determine that k1 is 0; or if the second physical channel is any one of a physical downlink data channel, a physical downlink control channel, an enhanced physical downlink control channel, a physical hybrid automatic repeat request indicator channel, and a physical control format indicator channel, and the frame structure type is time division duplex, determine that k1 is −1; or if the second physical channel is any one of a physical downlink data channel, a physical downlink control channel, an enhanced physical downlink control channel, a physical hybrid automatic repeat request indicator channel, and a physical control format indicator channel, and the category of the UE is 0, determine that k1 is −1; or if the second physical channel is any one of a physical downlink data channel, a physical downlink control channel, an enhanced physical downlink control channel, a physical hybrid automatic repeat request indicator channel, and a physical control format indicator channel, the category of the UE is 0, and the frame structure type is frequency division duplex or half-frequency division duplex, determine that k1 is −1; or if the second physical channel is any one of a physical downlink data channel, a physical downlink control channel, an enhanced physical downlink control channel, a physical hybrid automatic repeat request indicator channel, and a physical control format indicator channel, the category of the UE is a nonzero value, and the frame structure type is time division duplex, determine that k1 is −1; or if the second physical channel is any one of a physical downlink data channel, a physical downlink control channel, an enhanced physical downlink control channel, a physical hybrid automatic repeat request indicator channel, and a physical control format indicator channel, the category of the UE is 0, and the frame structure type is time division duplex, determine that k1 is −2.

With reference to the seventh possible implementation manner of the second aspect, in a tenth possible implementation manner, the processor is specifically configured to: if the second physical channel is a physical broadcast channel, a synchronization channel, or a physical downlink data channel that bears system information, and the frame structure type is frequency division duplex or half-frequency division duplex, determine that k1 is 1; or if the second physical channel is a physical broadcast channel, a synchronization channel, or a physical downlink data channel that bears system information, and the category of the UE is a nonzero value, determine that k1 is 1; or if the second physical channel is a physical broadcast channel, a synchronization channel, or a physical downlink data channel that bears system information, the category of the UE is a nonzero value, and the frame structure type is frequency division duplex or half-frequency division duplex, determine that k1 is 1; or if the second physical channel is a physical broadcast channel, a synchronization channel, or a physical downlink data channel that bears system information, and the frame structure type is a system and is time division duplex, determine that k1 is 0; or if the second physical channel is a physical broadcast channel, a synchronization channel, or a physical downlink data channel that bears system information, and the category of the UE is 0, determine that k1 is 0; or if the second physical channel is a physical broadcast channel, a synchronization channel, or a physical downlink data channel that bears system information, the category of the UE is 0, and the frame structure type is frequency division duplex or half-frequency division duplex, determine that k1 is 0; or if the second physical channel is a physical broadcast channel, a synchronization channel, or a physical downlink data channel that bears system information, the category of the UE is a nonzero value, and the frame structure type is time division duplex, determine that k1 is 0; or if the second physical channel is a physical broadcast channel, a synchronization channel, or a physical downlink data channel that bears system information, the category of the UE is a nonzero value, and the frame structure type is frequency division duplex or half-frequency division duplex, determine that k1 is 0; or if the second physical channel is a physical broadcast channel, a synchronization channel, or a physical downlink data channel that bears system information, the category of the UE is 0, and a network system is time division duplex, determine that k1 is −1; or if the second physical channel is a physical broadcast channel, a synchronization channel, or a physical downlink data channel that bears system information, the category of the UE is 0, and the frame structure type is frequency division duplex or half-frequency division duplex, determine that k1 is −1; or if the second physical channel is a physical broadcast channel, a synchronization channel, or a physical downlink data channel that bears system information, the category of the UE is a nonzero value, and the frame structure type is time division duplex, determine that k1 is −1; or if the second physical channel is a physical broadcast channel, a synchronization channel, or a physical downlink data channel that bears system information, the category of the UE is 0, and the frame structure type is time division duplex, determine that k1 is −2.

With reference to any one of the second aspect to the second possible implementation manner of the second aspect, in an eleventh possible implementation manner, the first transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel, where n is a positive integer; and the determining a second transmission manner of a second physical channel according to the first transmission manner includes that:

if the first physical channel is the first physical channel is a physical random access channel or an enhanced physical random access channel, and the second physical channel is a physical uplink shared channel, the second transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel; or if the first physical channel is a physical uplink shared channel, and the second physical channel is a physical random access channel or an enhanced physical random access channel, the second transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel.

The present disclosure provides a data transmission method and a communications device. A first transmission manner of a first physical channel is determined, where the first transmission manner is a manner in which data transmission is performed on the first physical channel; a second transmission manner of a second physical channel is determined according to the first transmission manner, where the second transmission manner is a manner in which data transmission is performed on the second physical channel. It is implemented that a transmission manner of a physical channel different from the first physical channel is determined according to the transmission manner of the first physical channel, and therefore it is implemented that different transmission manners are applied to different channels.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure are applicable to that a base station or UE determines a transmission manner of a second channel according to a transmission manner of a first channel, where the first channel and the second channel are different channels, and the first channel and the second channel may be different uplink channels or different downlink channels or may be an uplink channel and a downlink channel respectively.

Figure 1:
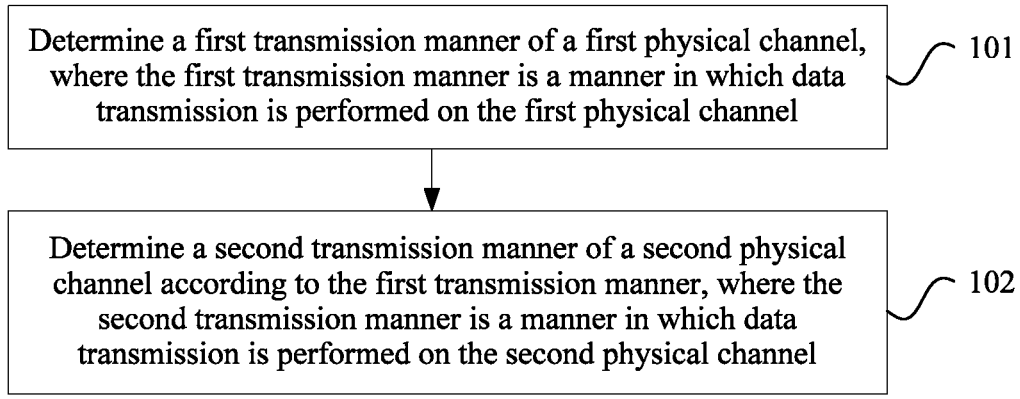
FIG. 1 is a flowchart of a data transmission method according to an embodiment of the present disclosure.

FIG. 1 is a flowchart of a data transmission method according to an embodiment of the present disclosure. As shown in FIG. 1, this embodiment is executed by user equipment UE or a base station. The method in this embodiment includes:

Step 101: Determine a first transmission manner of a first physical channel, where the first transmission manner is a manner in which data transmission is performed on the first physical channel.

There are at least the following two implementation manners of determining the first transmission manner of the first physical channel.

In a first implementation manner, the first physical channel is acquired, and the first transmission manner is determined according to the first physical channel.

In a second implementation manner, channel configuration information is acquired, and the first transmission manner is determined according to the channel configuration information, where the channel configuration information includes configuration information of the first physical channel.

For example, the first physical channel in this embodiment may be one or more of a physical uplink shared channel, a physical random access channel, an enhanced physical random access channel, a physical downlink control channel, an enhanced physical downlink control channel, a physical control format indicator channel, a physical hybrid automatic repeat request indicator channel, a physical downlink shared channel that bears unicast data, a physical downlink shared channel that bears broadcast or multicast data, a physical downlink shared channel that bears a random access response message, the physical uplink shared channel, a physical uplink control channel, a synchronization channel, and a physical broadcast channel.

The first transmission manner in this embodiment may be one or more of an enhanced transmission mode, a non-enhanced transmission mode, a default transmission mode, a fallback transmission mode, a resource, a resource index, a level, a level index, an enhancement level, an enhancement level index, a repetition level, a repetition level index, a quantity of levels, a repetition number, an index of a repetition number, a repetition value, a coverage enhancement value, a coverage enhancement range index, a quantity of detections on a pre-specified channel, a level of detection on a pre-specified channel, and an index of a quantity of detections on a pre-specified channel.

Step 102: Determine a second transmission manner of a second physical channel according to the first transmission manner, where the second transmission manner is a manner in which data transmission is performed on the second physical channel.

The second physical channel in this embodiment may be one or more of a physical uplink shared channel, a physical random access channel, an enhanced physical random access channel, a physical downlink control channel, an enhanced physical downlink control channel, a physical control format indicator channel, a physical hybrid automatic repeat request indicator channel, a physical downlink shared channel that bears unicast data, a physical downlink shared channel that bears broadcast or multicast data, a physical downlink shared channel that bears a random access response message, the physical uplink shared channel, a physical uplink control channel, a synchronization channel, and a physical broadcast channel.

Information about the second transmission manner in this embodiment may be one or more of an enhanced transmission mode, a non-enhanced transmission mode, a default transmission mode, a fallback transmission mode, a resource, a resource index, a level, a level index, an enhancement level, an enhancement level index, a repetition level, a repetition level index, a quantity of levels, a repetition number, an index of a repetition number, a repetition value, a coverage enhancement value, a coverage enhancement range index, a quantity of detections on a pre-specified channel, a level of detection on a pre-specified channel, and an index of a quantity of detections on a pre-specified channel.

It should be noted that, the first physical channel and the second physical channel in this embodiment may be an uplink channel and a downlink channel respectively, or may be different uplink channels, or may be different downlink channels.

For example, if the first physical channel is a physical random access channel, an enhanced physical random access channel, or a physical uplink shared channel, and the first transmission manner is a non-enhanced transmission mode, a default transmission mode, or a fallback transmission mode, the second transmission manner is a non-enhanced transmission mode, a default transmission mode, or a fallback transmission mode; or for example, if the first physical channel is a physical random access channel, an enhanced physical random access channel, or a physical uplink shared channel, the first transmission manner is an $(n1+k1+1)^{th}$ resource, an $(n1+k1+1)^{th}$ resource level, an $(n1+k1+1)^{th}$ level, an $(n1+k1+1)^{th}$ enhancement level, an $(n1+k1+1)^{th}$ repetition level, a configuration of an $(n1+k1+1)^{th}$ repetition, or an $(n1+k1+1)^{th}$ level of detection on a pre-specified channel, where k1 is an integer and n1 is a positive integer, and the second physical channel is any one of the foregoing channels, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

Further, if the second physical channel is a physical uplink control channel, k1 is 0. Specifically, if the first physical channel is a physical random access channel, an enhanced physical random access channel, or a physical uplink shared channel, the first transmission manner is an $(n1+1)^{th}$ resource, an $(n1+1)^{th}$ resource level, an $(n1+1)^{th}$ level, an $(n1+1)^{th}$ enhancement level, an $(n1+1)^{th}$ repetition level, a configuration of an $(n1+1)^{th}$ repetition, or an $(n1+1)^{th}$ level of detection on a pre-specified channel, where n1 is a positive integer, the second physical channel is a physical uplink control channel, and/or a frame structure type is frequency division duplex or half-frequency division duplex, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

If the second physical channel is any one of a physical downlink data channel, a physical downlink control channel, an enhanced physical downlink control channel, a physical hybrid automatic repeat request indicator channel, and a physical control format indicator channel, k1 is 0. Specifically, if the first physical channel is a physical random access channel, an enhanced physical random access channel, or a physical uplink shared channel, the first transmission manner is an $(n1+1)^{th}$ resource, an $(n1+1)^{th}$ resource level, an $(n1+1)^{th}$ level, an $(n1+1)^{th}$ enhancement level, an $(n1+1)^{th}$ repetition level, a configuration of an $(n1+1)^{th}$ repetition, or an $(n1+1)^{th}$ level of detection on a pre-specified channel, where n1 is a positive integer, and the second physical channel is any one of a physical downlink data channel, a physical downlink control channel, an enhanced physical downlink control channel, a physical hybrid automatic repeat request indicator channel, and a physical control format indicator channel, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

If the second physical channel is a physical broadcast channel, a synchronization channel, or a physical downlink data channel that bears system information, k1 is 1. Specifically, if the first physical channel is a physical random access channel, an enhanced physical random access channel, or a physical uplink shared channel, the first transmission manner is an $(n1+2)^{th}$ resource, an $(n1+2)^{th}$ resource level, an $(n1+2)^{th}$ level, an $(n1+2)^{th}$ enhancement level, an $(n1+2)^{th}$ repetition level, a configuration of an $(n1+2)^{th}$ repetition, or an $(n1+2)^{th}$ level of detection on a pre-specified channel, where n1 is a positive integer, and the second physical channel is a physical broadcast channel, a synchronization channel, or a physical downlink data channel that bears system information, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel or an enhanced physical random access channel, the second physical channel is a physical uplink shared channel, and the first transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel, where n is a positive integer, the second transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel; or for example, if the first physical channel is a physical uplink shared channel, the second physical channel is a physical random access channel or an enhanced physical random access channel, and the first transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel, where n is a positive integer, the second transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel. Or, In this embodiment, a first transmission manner of a first physical channel is determined, where the first transmission manner is a manner in which data transmission is performed on the first physical channel; a second transmission manner of a second physical channel is determined according to the first transmission manner, where the second transmission manner is a manner in which data transmission is performed on the second physical channel. It is implemented that a transmission manner of a physical channel different from the first physical channel is determined according to the transmission manner of the first physical channel, and therefore it is implemented that different transmission manners are applied to different channels.

Based on the foregoing embodiment, the determining a second transmission manner of a second physical channel according to the first transmission manner in step 102 includes:

determining the second transmission manner of the second physical channel according to the first transmission manner and third information.

In this embodiment, the third information is one or more of a frame structure type, a class of user equipment UE, a category of the UE, a type of the UE, a modulation and coding scheme, a power setting, a spreading factor, a power boost multiplier, a quantity of attempt times, information about a transmission time interval bundling size, a frequency hopping status, a performance requirement, an antenna configuration, a transport block size, and a quantity of transport layers.

For example, if the first physical channel is a physical random access channel, an enhanced physical random access channel, or a physical uplink shared channel, the first transmission manner is a non-enhanced transmission mode, a default transmission mode, or a fallback transmission mode, and the class or category of the UE is 0, the second transmission manner is an enhanced transmission mode; or for example, if the first physical channel is a physical random access channel, an enhanced physical random access channel, or a physical uplink shared channel, the first transmission manner is a non-enhanced transmission mode, a default transmission mode, or a fallback transmission mode, and the class or category of the UE is 0, the second transmission manner is a non-enhanced transmission mode, a default transmission mode, or a fallback transmission mode.

If the second physical channel is a physical uplink control channel, and/or the frame structure type is frequency division duplex or half-frequency division duplex, k1 is 0. Specifically, if the first physical channel is a physical random access channel, an enhanced physical random access channel, or a physical uplink shared channel, the first transmission manner is an $(n1+1)^{th}$ resource, an $(n1+1)^{th}$ resource level, an $(n1+1)^{th}$ level, an $(n1+1)^{th}$ enhancement level, an $(n1+1)^{th}$ repetition level, a configuration of an $(n1+1)^{th}$ repetition, or an $(n1+1)^{th}$ level of detection on a pre-specified channel, where n1 is a positive integer, the second physical channel is a physical uplink control channel, and/or the frame structure type is frequency division duplex or half-frequency division duplex, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

Alternatively, if the second physical channel is a physical uplink control channel, and the frame structure type is a time division duplex system, k1 is −1. Specifically, if the first physical channel is a physical random access channel, an enhanced physical random access channel, or a physical uplink shared channel, the first transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel, where n1 is a positive integer, the second physical channel is a physical uplink control channel, and/or the frame structure type is time division duplex, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

If the second physical channel is any one of a physical downlink data channel, a physical downlink control channel, an enhanced physical downlink control channel, a physical hybrid automatic repeat request indicator channel, and a physical control format indicator channel, the frame structure type is frequency division duplex or half-frequency division duplex, and/or the category of the UE is a nonzero value, k1 is 0. Specifically, if the first physical channel is a physical random access channel, an enhanced physical random access channel, or a physical uplink shared channel, the first transmission manner is an $(n1+1)^{th}$ resource, an $(n1+1)^{th}$ resource level, an $(n1+1)^{th}$ level, an $(n1+1)^{th}$ enhancement level, an $(n1+1)^{th}$ repetition level, a configuration of an $(n1+1)^{th}$ repetition, or an $(n1+1)^{th}$ level of detection on a pre-specified channel, where n1 is a positive integer, the second physical channel is any one of a physical downlink data channel, a physical downlink control channel, an enhanced physical downlink control channel, a physical hybrid automatic repeat request indicator channel, and a physical control format indicator channel, the structure type is frequency division duplex or half-frequency division duplex, and/or the category of the UE is a nonzero value, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

If the second physical channel is any one of a physical downlink control channel, a physical downlink control channel, an enhanced physical downlink control channel, a physical hybrid automatic repeat request indicator channel, and a physical control format indicator channel, and the frame structure type is time division duplex, k1 is −1. For example, if the first physical channel is a physical random access channel, an enhanced physical random access channel, or a physical uplink shared channel, the first transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel, where k1 is an integer and n1 is a positive integer, the second physical channel is any one of a physical downlink data channel, a physical downlink control channel, an enhanced physical downlink control channel, a physical hybrid automatic repeat request indicator channel, and a physical control format indicator channel, and the frame structure type is time division duplex, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel, where k1 is an integer and n1 is a positive integer, the second physical channel is any one of a physical downlink data channel, a physical downlink control channel, an enhanced physical downlink control channel, a physical hybrid automatic repeat request indicator channel, and a physical control format indicator channel, and the category of the UE is 0, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel, where k1 is an integer and n1 is a positive integer, the second physical channel is any one of a physical downlink data channel, a physical downlink control channel, an enhanced physical downlink control channel, a physical hybrid automatic repeat request indicator channel, and a physical control format indicator channel, and the category of the UE is 0, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel, where k1 is an integer and n1 is a positive integer, the second physical channel is any one of a physical downlink data channel, a physical downlink control channel, an enhanced physical downlink control channel, a physical hybrid automatic repeat request indicator channel, and a physical control format indicator channel, and the category of the UE is a nonzero value, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1-1)^{th}$ resource, an $(n1-1)^{th}$ resource level, an $(n1-1)^{th}$ level, an $(n1-1)^{th}$ enhancement level, an $(n1-1)^{th}$ repetition level, a configuration of an $(n1-1)^{th}$ repetition, or an $(n1-1)^{th}$ level of detection on a pre-specified channel, where n1 is a positive integer, the second physical channel is any one of a physical downlink data channel, a physical downlink control channel, an enhanced physical downlink control channel, a physical hybrid automatic repeat request indicator channel, and a physical control format indicator channel, the category of the UE is 0, and the frame structure type is time division duplex, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1+2)^{th}$ resource, an $(n1+2)^{th}$ resource level, an $(n1+2)^{th}$ level, an $(n1+2)^{th}$ enhancement level, an $(n1+2)^{th}$ repetition level, a configuration of an $(n1+2)^{th}$ repetition, or an $(n1+2)^{th}$ level of detection on a pre-specified channel, where n1 is a positive integer, the second physical channel is a physical broadcast channel, a synchronization channel, or a physical downlink data channel that bears system information, and the frame structure type is frequency division duplex or half-frequency division duplex, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1+1)^{th}$ resource, an $(n1+1)^{th}$ resource level, an $(n1+1)^{th}$ level, an $(n1+1)^{th}$ enhancement level, an $(n1+1)^{th}$ repetition level, a configuration of an $(n1+1)^{th}$ repetition, or an $(n1+1)^{th}$ level of detection on a pre-specified channel, where n1 is a positive integer, the second physical channel is a physical broadcast channel, a synchronization channel, or a physical downlink data channel that bears system information, and the frame structure type is time division duplex, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1+1)^{th}$ resource, an $(n1+1)^{th}$ resource level, an $(n1+1)^{th}$ level, an $(n1+1)^{th}$ enhancement level, an $(n1+1)^{th}$ repetition level, a configuration of an $(n1+1)^{th}$ repetition, or an $(n1+1)^{th}$ level of detection on a pre-specified channel, where n1 is a positive integer, the second physical channel is a physical broadcast channel, a synchronization channel, or a physical downlink data channel that bears system information, and the category of the UE is 0, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1+1)^{th}$ resource, an $(n1+1)^{th}$ resource level, an $(n1+1)^{th}$ level, an $(n1+1)^{th}$ enhancement level, an $(n1+1)^{th}$ repetition level, a configuration of an $(n1+1)^{th}$ repetition, or an $(n1+1)^{th}$ level of detection on a pre-specified channel, where n1 is a positive integer, the second physical channel is a physical broadcast channel, a synchronization channel, or a physical downlink data channel that bears system information, the frame structure type is frequency division duplex or half-frequency division duplex, and the category of the UE is 0, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1+1)^{th}$ resource, an $(n1+1)^{th}$ resource level, an $(n1+1)^{th}$ level, an $(n1+1)^{th}$ enhancement level, an $(n1+1)^{th}$ repetition level, a configuration of an $(n1+1)^{th}$ repetition, or an $(n1+1)^{th}$ level of detection on a pre-specified channel, where n1 is a positive integer, the second physical channel is a physical broadcast channel, a synchronization channel, or a physical downlink data channel that bears system information, the frame structure type is time division duplex, and the category of the UE is 0, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel, where n1 is a positive integer, the second physical channel is any one of a physical downlink data channel, a physical downlink control channel, an enhanced physical downlink control channel, a physical hybrid automatic repeat request indicator channel, and a physical control format indicator channel, and the frame structure type is time division duplex, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1+1)^{th}$ resource, an $(n1+1)^{th}$ resource level, an $(n1+1)^{th}$ level, an $(n1+1)^{th}$ enhancement level, an $(n1+1)^{th}$ repetition level, a configuration of an $(n1+1)^{th}$ repetition, or an $(n1+1)^{th}$ level of detection on a pre-specified channel, where n1 is a positive integer, the second physical channel is any one of a physical downlink data channel, a physical downlink control channel, an enhanced physical downlink control channel, a physical hybrid automatic repeat request indicator channel, and a physical control format indicator channel, and the category of the UE is 0, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel, where n1 is a positive integer, the second physical channel is any one of a physical downlink data channel, a physical downlink control channel, an enhanced physical downlink control channel, a physical hybrid automatic repeat request indicator channel, and a physical control format indicator channel, and the category of the UE is 0, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel, where n1 is a positive integer, the second physical channel is any one of a physical downlink data channel, a physical downlink control channel, an enhanced physical downlink control channel, a physical hybrid automatic repeat request indicator channel, and a physical control format indicator channel, the category of the UE is 0, and the frame structure type is frequency division duplex or half-frequency division duplex, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel, where n1 is a positive integer, the second physical channel is a physical broadcast channel, a synchronization channel, or a physical downlink data channel that bears system information, the category of the UE is a nonzero value, and the frame structure type is time division duplex, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

For example, if the first physical channel is a physical random access channel, an enhanced physical random access channel, or a physical uplink shared channel, the first transmission manner is an $(n1-1)^{th}$ resource, an $(n1-1)^{th}$ resource level, an $(n1-1)^{th}$ level, an $(n1-1)^{th}$ enhancement level, an $(n1-1)^{th}$ repetition level, a configuration of an $(n1-1)^{th}$ repetition, or an $(n1-1)^{th}$ level of detection on a pre-specified channel, where n1 is a positive integer, the second physical channel is a physical broadcast channel, a synchronization channel, or a physical downlink data channel that bears system information, the category of the UE is 0, and the frame structure type is time division duplex, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

Figure 2:
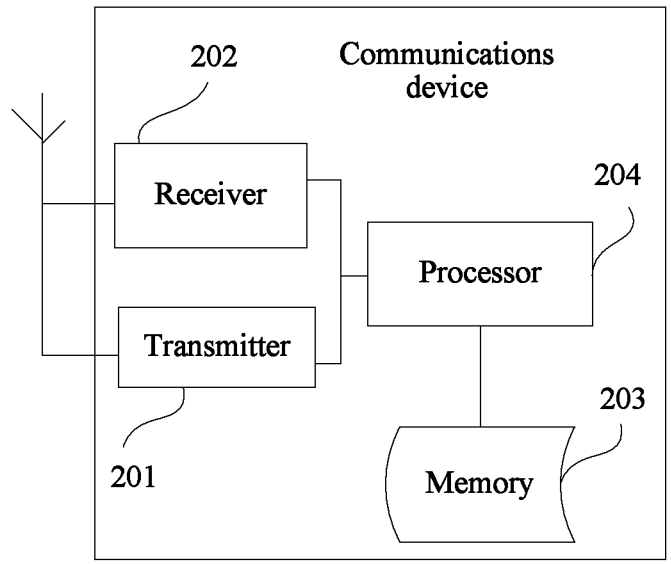
FIG. 2 is a schematic structural diagram of a communications device according to an embodiment of the present disclosure.

FIG. 2 is a schematic structural diagram of a communications device according to an embodiment of the present disclosure. As shown in FIG. 2, the communications device includes a transmitter 201, a receiver 202, a memory 203, and a processor 204 that is separately connected to the transmitter 201, the receiver 202, and the memory 203.

The processor 204 is configured to determine a first transmission manner of a first physical channel, where the first transmission manner is a manner in which data transmission is performed on the first physical channel; and determine a second transmission manner of a second physical channel according to the first transmission manner, where the second transmission manner is a manner in which data transmission is performed on the second physical channel.

In this embodiment, a first transmission manner of a first physical channel is determined, where the first transmission manner is a manner in which data transmission is performed on the first physical channel; a second transmission manner of a second physical channel is determined according to the first transmission manner, where the second transmission manner is a manner in which data transmission is performed on the second physical channel. It is implemented that a transmission manner of a physical channel different from the first physical channel is determined according to the transmission manner of the first physical channel, and therefore it is implemented that different transmission manners are applied to different channels.

Based on the foregoing embodiment, the receiver 202 is configured to acquire the first physical channel, and determine the first transmission manner according to the first physical channel; or acquire channel configuration information, and determine the first transmission manner according to the channel configuration information, where the channel configuration information includes configuration information of the first physical channel.

Based on the foregoing embodiment, the first transmission manner is one or more of an enhanced transmission mode, a non-enhanced transmission mode, a default transmission mode, a fallback transmission mode, a resource, a resource index, a level, a level index, an enhancement level, an enhancement level index, a repetition level, a repetition level index, a quantity of levels, a repetition number, an index of a repetition number, a repetition value, a coverage enhancement value, a coverage enhancement range index, a quantity of detections on a pre-specified channel, a level of detection on a pre-specified channel, and an index of a quantity of detections on a pre-specified channel;

information about the second transmission manner is one or more of an enhanced transmission mode, a non-enhanced transmission mode, a default transmission mode, a fallback transmission mode, a resource, a resource index, a level, a level index, an enhancement level, an enhancement level index, a repetition level, a repetition level index, a quantity of levels, a repetition number, an index of a repetition number, a repetition value, a coverage enhancement value, a coverage enhancement range index, a quantity of detections on a pre-specified channel, a level of detection on a pre-specified channel, and an index of a quantity of detections on a pre-specified channel;

the first physical channel is one or more of a physical uplink shared channel, a physical random access channel, an enhanced physical random access channel, a physical downlink control channel, an enhanced physical downlink control channel, a physical control format indicator channel, a physical hybrid automatic repeat request indicator channel, a physical downlink shared channel that bears unicast data, a physical downlink shared channel that bears broadcast or multicast data, a physical downlink shared channel that bears a random access response message, the physical uplink shared channel, a physical uplink control channel, a synchronization channel, and a physical broadcast channel; and the second physical channel is one or more of a physical uplink shared channel, a physical random access channel, an enhanced physical random access channel, a physical downlink control channel, an enhanced physical downlink control channel, a physical control format indicator channel, a physical hybrid automatic repeat request indicator channel, a physical downlink shared channel that bears unicast data, a physical downlink shared channel that bears broadcast or multicast data, a physical downlink shared channel that bears a random access response message, the physical uplink shared channel, a physical uplink control channel, a synchronization channel, and a physical broadcast channel.

Based on the foregoing embodiment, if the first transmission manner is an $(n1+k1+1)^{th}$ resource, an $(n1+k1+1)^{th}$ resource level, an $(n1+k1+1)^{th}$ level, an $(n1+k1+1)^{th}$ enhancement level, an $(n1+k1+1)^{th}$ repetition level, a configuration of an $(n1+k1+1)^{th}$ repetition, or an $(n1+k1+1)^{th}$ level of detection on a pre-specified channel, where k1 is an integer and n1 is a positive integer, correspondingly, the second transmission manner is an $(n1)^{th}$ resource, an $(n1)^{th}$ resource level, an $(n1)^{th}$ level, an $(n1)^{th}$ enhancement level, an $(n1)^{th}$ repetition level, a configuration of an $(n1)^{th}$ repetition, or an $(n1)^{th}$ level of detection on a pre-specified channel.

Based on the foregoing embodiment, the first physical channel is a physical random access channel, an enhanced physical random access channel, or a physical uplink shared channel.

Based on the foregoing embodiment, the determining a second transmission manner of a second physical channel according to the first transmission manner includes that:

if the first transmission manner is a non-enhanced transmission mode, a default transmission mode, or a fallback transmission mode, the second transmission manner is a non-enhanced transmission mode, a default transmission mode, or a fallback transmission mode, or if the second physical channel is any one of a physical downlink data channel, a physical downlink control channel, an enhanced physical downlink control channel, a physical hybrid automatic repeat request indicator channel, and a physical control format indicator channel, k1 is 0; or if the second physical channel is a physical broadcast channel, a synchronization channel, or a physical downlink data channel that bears system information, k1 is 1; or if the second physical channel is any one of a physical downlink data channel, a physical downlink control channel, an enhanced physical downlink control channel, a physical hybrid automatic repeat request indicator channel, and a physical control format indicator channel, k1 is 0.

Based on the foregoing embodiment, the processor 204 is specifically configured to determine the second transmission manner of the second physical channel according to the first transmission manner and third information, where the third information is one or more of a frame structure type, a class of user equipment UE, a category of the UE, a type of the UE, a modulation and coding scheme, a power setting, a spreading factor, a power boost multiplier, a quantity of attempt times, information about a transmission time interval bundling size, a frequency hopping status, a performance requirement, an antenna configuration, a transport block size, and a quantity of transport layers.

Based on the foregoing embodiment, the processor 204 is specifically configured to: if the first transmission manner is a non-enhanced transmission mode, a default transmission mode, or a fallback transmission mode, and the class or category of the UE is 0, determine that the second transmission manner is an enhanced transmission mode; or if the first transmission manner is a non-enhanced transmission mode, a default transmission mode, or a fallback transmission mode, and the class or category of the UE is 0, determine that the second transmission manner is a non-enhanced transmission mode, a default transmission mode, or a fallback transmission mode.

Based on the foregoing embodiment, the processor 204 is further configured to: if the second physical channel is a physical uplink control channel, and/or the frame structure type is frequency division duplex or half-frequency division duplex, determine that k1 is 0; or if the second physical channel is a physical uplink control channel, and the frame structure type is a time division duplex system, determine that k1 is −1.

Based on the foregoing embodiment, the processor 204 is specifically configured to: if the second physical channel is any one of a physical downlink data channel, a physical downlink control channel, an enhanced physical downlink control channel, a physical hybrid automatic repeat request indicator channel, and a physical control format indicator channel, the frame structure type is frequency division duplex or half-frequency division duplex, and/or the category of the UE is a nonzero value, determine that k1 is 0; or if the second physical channel is any one of a physical downlink data channel, a physical downlink control channel, an enhanced physical downlink control channel, a physical hybrid automatic repeat request indicator channel, and a physical control format indicator channel, and the frame structure type is time division duplex, determine that k1 is −1; or if the second physical channel is any one of a physical downlink data channel, a physical downlink control channel, an enhanced physical downlink control channel, a physical hybrid automatic repeat request indicator channel, and a physical control format indicator channel, and the category of the UE is 0, determine that k1 is −1; or if the second physical channel is any one of a physical downlink data channel, a physical downlink control channel, an enhanced physical downlink control channel, a physical hybrid automatic repeat request indicator channel, and a physical control format indicator channel, the category of the UE is 0, and the frame structure type is frequency division duplex or half-frequency division duplex, determine that k1 is −1; or if the second physical channel is any one of a physical downlink data channel, a physical downlink control channel, an enhanced physical downlink control channel, a physical hybrid automatic repeat request indicator channel, and a physical control format indicator channel, the category of the UE is a nonzero value, and the frame structure type is time division duplex, determine that k1 is −1; or if the second physical channel is any one of a physical downlink data channel, a physical downlink control channel, an enhanced physical downlink control channel, a physical hybrid automatic repeat request indicator channel, and a physical control format indicator channel, the category of the UE is 0, and the frame structure type is time division duplex, determine that k1 is −2.

Based on the foregoing embodiment, the processor 204 is specifically configured to: if the second physical channel is a physical broadcast channel, a synchronization channel, or a physical downlink data channel that bears system information, and the frame structure type is frequency division duplex or half-frequency division duplex, determine that k1 is 1; or if the second physical channel is a physical broadcast channel, a synchronization channel, or a physical downlink data channel that bears system information, and the category of the UE is a nonzero value, determine that k1 is 1; or if the second physical channel is a physical broadcast channel, a synchronization channel, or a physical downlink data channel that bears system information, the category of the UE is a nonzero value, and the frame structure type is frequency division duplex or half-frequency division duplex, determine that k1 is 1; or if the second physical channel is a physical broadcast channel, a synchronization channel, or a physical downlink data channel that bears system information, and the frame structure type is a system and is time division duplex, determine that k1 is 0; or if the second physical channel is a physical broadcast channel, a synchronization channel, or a physical downlink data channel that bears system information, and the category of the UE is 0, determine that k1 is 0; or if the second physical channel is a physical broadcast channel, a synchronization channel, or a physical downlink data channel that bears system information, the category of the UE is 0, and the frame structure type is frequency division duplex or half-frequency division duplex, determine that k1 is 0; or if the second physical channel is a physical broadcast channel, a synchronization channel, or a physical downlink data channel that bears system information, the category of the UE is a nonzero value, and the frame structure type is time division duplex, determine that k1 is 0; or if the second physical channel is a physical broadcast channel, a synchronization channel, or a physical downlink data channel that bears system information, the category of the UE is a nonzero value, and the frame structure type is frequency division duplex or half-frequency division duplex, determine that k1 is 0; or if the second physical channel is a physical broadcast channel, a synchronization channel, or a physical downlink data channel that bears system information, the category of the UE is 0, and a network system is time division duplex, determine that k1 is −1; or if the second physical channel is a physical broadcast channel, a synchronization channel, or a physical downlink data channel that bears system information, the category of the UE is 0, and the frame structure type is frequency division duplex or half-frequency division duplex, determine that k1 is −1; or if the second physical channel is a physical broadcast channel, a synchronization channel, or a physical downlink data channel that bears system information, the category of the UE is a nonzero value, and the frame structure type is time division duplex, determine that k1 is −1; or if the second physical channel is a physical broadcast channel, a synchronization channel, or a physical downlink data channel that bears system information, the category of the UE is 0, and the frame structure type is time division duplex, determine that k1 is −2.

Based on the foregoing embodiment, the first transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel, where n is a positive integer.

The determining a second transmission manner of a second physical channel according to the first transmission manner includes that:

if the first physical channel is the first physical channel is a physical random access channel or an enhanced physical random access channel, and the second physical channel is a physical uplink shared channel, the second transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel; or if the first physical channel is a physical uplink shared channel, and the second physical channel is a physical random access channel or an enhanced physical random access channel, the second transmission manner is an $(n)^{th}$ resource, an $(n)^{th}$ resource level, an $(n)^{th}$ level, an $(n)^{th}$ enhancement level, an $(n)^{th}$ repetition level, a configuration of an $(n)^{th}$ repetition, or an $(n)^{th}$ level of detection on a pre-specified channel.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method at a user equipment, comprising: receiving a physical downlink control channel from a base station; determining an index of a repetition number of the physical downlink control channel; and determining a repetition number of a physical downlink shared channel that bears broadcast or multicast data according to the index of the repetition number of the physical downlink control channel, wherein the determining the repetition number comprises: determining the repetition number of the physical downlink shared channel that bears broadcast or multicast data is (n1) times if the index of the repetition number of the physical downlink control channel indicates an (n1+k1+1)-times repetition of the physical downlink control channel, wherein k1 is an integer and n1 is a positive integer; wherein if a frame structure type is frequency division duplex or half-frequency division duplex, and a category of the UE is a nonzero value, k1 is 0; and wherein if the category of the UE is 0 and the frame structure type is time division duplex, k1 is −2; and wherein the method further comprises receiving the physical downlink shared channel from the base station based on the repetition number of the physical downlink shared channel.

2. A communications device, comprising: a transmitter, a receiver, a memory, and a processor that is connected to the transmitter, the receiver, and the memory, wherein: the receiver is configured to receive a physical downlink control channel from a base station; the processor is configured to determine an index of a repetition number of the physical downlink control channel and determine a repetition number of a a physical downlink shared channel that bears broadcast or multicast data according to the index of the repetition number of the physical downlink control channel, wherein the determining the repetition number comprises: determining the repetition number of the physical downlink shared channel that bears broadcast or multicast data is (n1) times if the index of the repetition number of the physical downlink control channel indicates an (n1+k1+1)-times repetition of the physical downlink control channel, wherein k1 is an integer and n1 is a positive integer; wherein if a frame structure type is frequency division duplex or half-frequency division duplex, and a category of the UE is a nonzero value, k1 is 0; and wherein if the category of the UE is 0 and the frame structure type is time division duplex, k1 is −2; and the receiver is further configured to receive the physical downlink shared channel from the base station based on the repetition number of the transmission of the physical downlink shared channel.

3. A communications device, comprising: a transmitter, a receiver, a memory, and a processor that is connected to the transmitter, the receiver, and the memory, wherein: the processor is configured to determine an index of a repetition number of a physical downlink control channel and determine a repetition number of a physical downlink shared channel that hears broadcast or multicast data according to the index of the repetition number of the physical downlink control channel, wherein the determining the repetition number comprises: determining the repetition number of the physical downlink shared channel that bears broadcast or multicast data is (n1) times if the index of the repetition number of the physical downlink control channel indicates an (n1+k1+1)-times repetition of the physical downlink control channel, wherein k1 is an integer and n1 is a positive integer; wherein if a frame structure type is frequency division duplex or half-frequency division duplex, and a category of the UE is a nonzero value, k1 is 0; and wherein if the category of the UE is 0 and the frame structure type is time division duplex, k1 is −2; and the transmitter is configured to transmit the physical downlink control channel and the physical downlink shared channel based on the repetition number to a user equipment.

* * * * *